United States Patent
Vaglica

[11] Patent Number: 6,150,595
[45] Date of Patent: Nov. 21, 2000

[54] PORTABLE AND ADJUSTABLE DRUM STICK STATION

[75] Inventor: Dominic Vaglica, Wood Dale, Ill.

[73] Assignee: Jamtec, Wood Dale, Ill.

[21] Appl. No.: 09/309,950

[22] Filed: May 11, 1999

[51] Int. Cl.[7] .............................. G10G 5/00; G10D 3/00; G10D 13/02

[52] U.S. Cl. .............................. 84/421; 84/327

[58] Field of Search ................ 84/421, 327, 411 R, 84/453, DIG. 3; D17/22; 248/276.1, 278.1, 288.11, 411, 443

[56] References Cited

U.S. PATENT DOCUMENTS

| | | | |
|---|---|---|---|
| D. 319,836 | 9/1991 | Clouse et al. | D17/22 |
| D. 386,780 | 11/1997 | Ohno | D17/22 |
| D. 389,356 | 1/1998 | Calabrese | D6/569 |
| 4,531,443 | 7/1985 | Gillis, Jr. | 84/329 |
| 4,732,070 | 3/1988 | Yamashita | 84/746 |
| 4,987,817 | 1/1991 | Diaz | 84/421 |
| 5,117,724 | 6/1992 | Gardner | 84/411 R |
| 5,435,220 | 7/1995 | Pultz | 84/329 |
| 5,522,300 | 6/1996 | Cheatwood | 84/453 |
| 5,551,660 | 9/1996 | Leduchowski | 248/276.1 |
| 5,622,344 | 4/1997 | Gracie | 248/171 |
| 5,684,258 | 11/1997 | Liao | 84/421 |
| 5,703,306 | 12/1997 | Liao | 84/421 |
| 5,758,870 | 6/1998 | Weaver | 269/329 |
| 5,845,885 | 12/1998 | Carnevali | 248/118.1 |
| 5,852,250 | 12/1998 | Cha | 84/327 |
| 5,936,176 | 8/1999 | Lombardi | 84/421 |

FOREIGN PATENT DOCUMENTS

273173  6/1927  United Kingdom .

*Primary Examiner*—David Martin
*Assistant Examiner*—Marlon Fletcher
*Attorney, Agent, or Firm*—IP Focus Law Group, Ltd.

[57] ABSTRACT

A receptacle suitable for receiving drum sticks features a transverse tandem rod clamp having a pair of spaced axially skewed clamp sockets, a tubular canister with an open end for receiving drum sticks, and a claw device for flexible attachment. The tubular canister includes an outwardly extending mounting rod slidably received in one socket of the rod clamp. A projecting mounting rod secured to the claw device is slidably received in the other socket of the rod clamp.

15 Claims, 7 Drawing Sheets

PORTABLE AND ADJUSTABLE DRUM STICK STATION

TECHNICAL FIELD OF THE INVENTION

This invention relates to devices for holding and storing percussion sticks such as drum sticks and xylophone mallets. In particular, the invention relates to portable and adjustable percussion stick stations.

BACKGROUND OF THE INVENTION

In the course of a musical performance, drummer's and other percussionist often need (or prefer) to change sticks frequently. Little time is generally available to make the transition from one set of drum sticks to another. It is therefore important that alternate sets of drum sticks be quickly available and readily identifiable.

Tray-like stick holders are one approach to the stick swapping problem. The tray holders may have individual compartment for arranging sticks by type. While reasonably well suited to a large orchestra setting, the tray-like holders do not work well for smaller groups, where space may be tight, because the trays are relatively bulky.

Efforts at overcoming the drum stick swapping problem are reflected in devices developed to make sticks available close to the drummers body. For example, U.S. Pat. No. 5,435,220 to Pultz describes a spring-loaded case for storing drum sticks that is attached to a drummer by a waist belt and a thigh strap.

U.S. Design Pat. No. 389,356 to Calabrese is directed to what is conventionally labelled "stick bag." Usually cloth or leather, stick bags have a number of pockets which allow percussion sticks to be arranged by type. Stick bags may folded for convenient transport. When percussion sticks are in use, stick bags may be unfolded and positioned near the drummer. Many stick bags may also be hung from a drum or the drummer's stool.

Strap-ons, stick bags and other conventional percussion stick holding devices suffer from one or more serious drawbacks. The conventional devices do not position unused percussion sticks in the direct access of the drummer while playing. The conventional stick holders also do not allow for quick, convenient repositioning of the stored percussion sticks. Also significant, the heretofore available stick holders are not readily attachable at points throughout the drum set.

Thus, there continues to be a need for a more user-friendly percussion stick holder and station. Specifically, it would be desirable to provide an improved percussion stick station that provides both a flexible, sturdy attachment system and extensive adjustability. Furthermore, there would be great advantage to percussion stick station that can be interchangeably attached to either a separate, devoted floor stand or alternatively attached to existing support stands in the drum/percussion section of a musical band or orchestra.

SUMMARY OF THE INVENTION

The present invention provides a user-friendly, versatile percussion stick receptacle suitable for musical percussion sticks. Notably, the receptacles of the present invention can be readily adjusted with respect to position and angle of access to stored percussion sticks.

A percussion stick receptacle according to the present invention includes a transverse tandem rod clamp that defines a pair of spaced axially skewed clamp sockets, a tubular canister having an open receiving end with opposite closed bottom, and an outwardly extending mounting rod slidably received in one of the pair of clamp sockets. The receptacle also includes a claw device terminating in a projecting mounting rod slidably received in the other of the pair clamp sockets.

In a preferred embodiment, at least one clamp socket of the transverse tandem rod clamp is equipped with a clamp-tension adjustment lever.

A free-standing embodiment of the present invention includes a stand subassembly with a projecting pivot stem mounted to a base, a transverse tandem rod clamp defining a pair of spaced axially skewed clamp sockets, and a tubular canister subassembly having an open receiving end and an opposite closed bottom, and an outwardly extending mounting rod. The projecting pivot stem of the stand subassembly is received in one of the pair of clamp sockets while the mounting rod of the tubular canister subassembly is received in the other of the clamp sockets.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENT

While this invention is susceptible to embodiment in many different forms, this specification and the accompanying drawings disclose only preferred forms as examples of the invention. The invention is not intended to be limited to the embodiments so described, however. The scope of the invention is identified in the appended claims.

Embodiments of the contemplated apparatus illustrated in the FIGURES show details of elements that are known in the art and that will be recognized by those skilled in the art as such. The detailed descriptions of such elements are not necessary to an understanding of the invention. Accordingly, such elements are herein represented only to the degree necessary to aid an understanding of the features of the present invention.

As used herein, the term "rod," includes extensions of various shapes (i.e. cylindrical) and various material constructions (i.e. hollow or tubular, semi-solid, solid, etc.). The phrases "percussion stick receptacle" and "percussion stick station" and "drum stick station" are herein used interchangeably.

Figure 1:
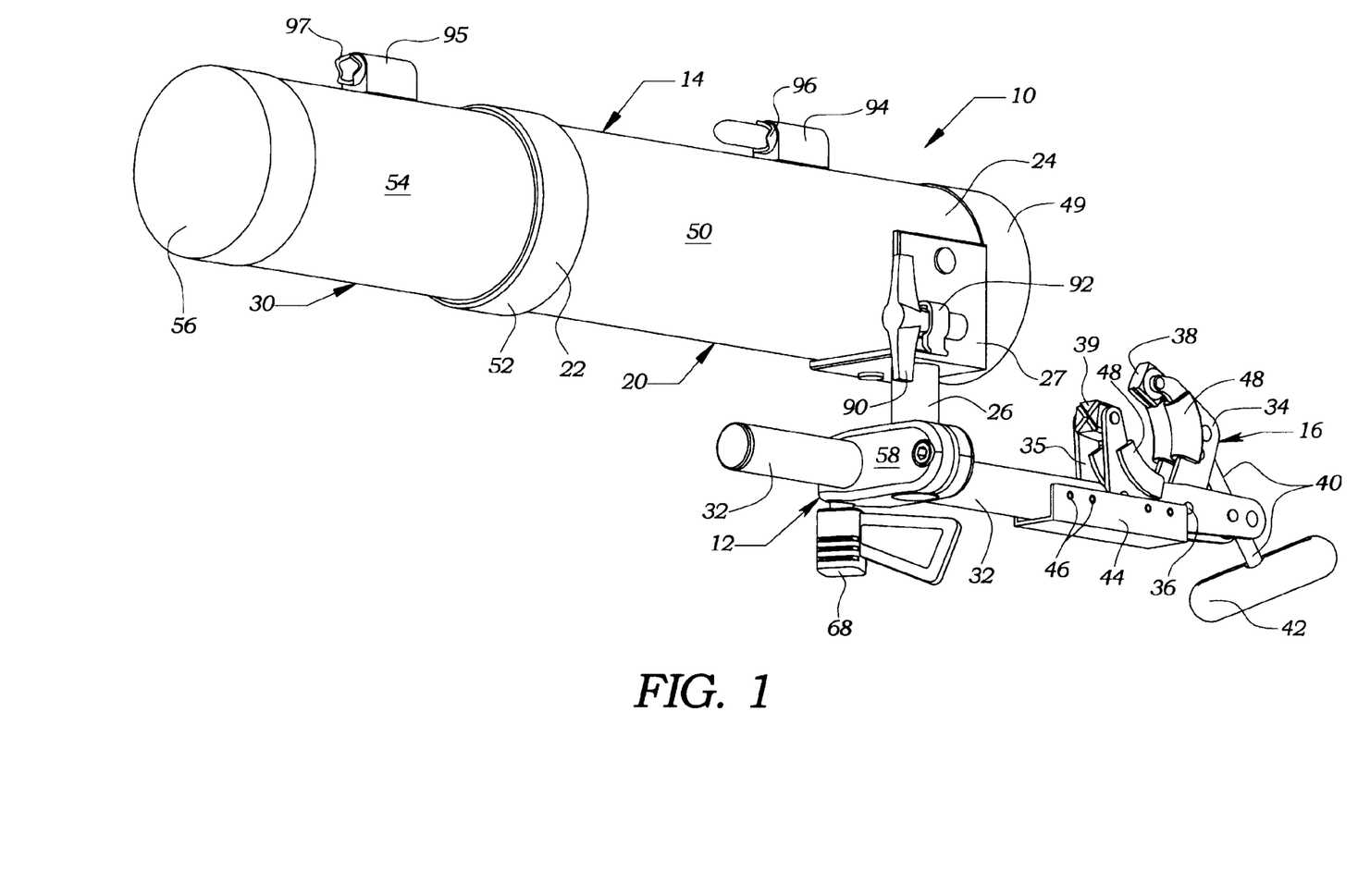
FIG. 1 is a perspective view of a percussion stick receptacle according to the present invention.

With reference to FIG. 1, a drum stick station/receptacle 10 is shown with a transverse tandem rod clamp 12, a tubular canister subassembly 14, and a claw device 16. The canister subassembly 14 includes a tubular canister 20, an open receiving end 22, an opposite closed bottom 24, and an outwardly extending mounting rod 26, which is slidably received in one of two sockets in tandem rod clamp 12. Tubular canister 20 is attached to mounting rod 26 by an angle bracket 27 and optionally includes a cover 30.

Figure 5:
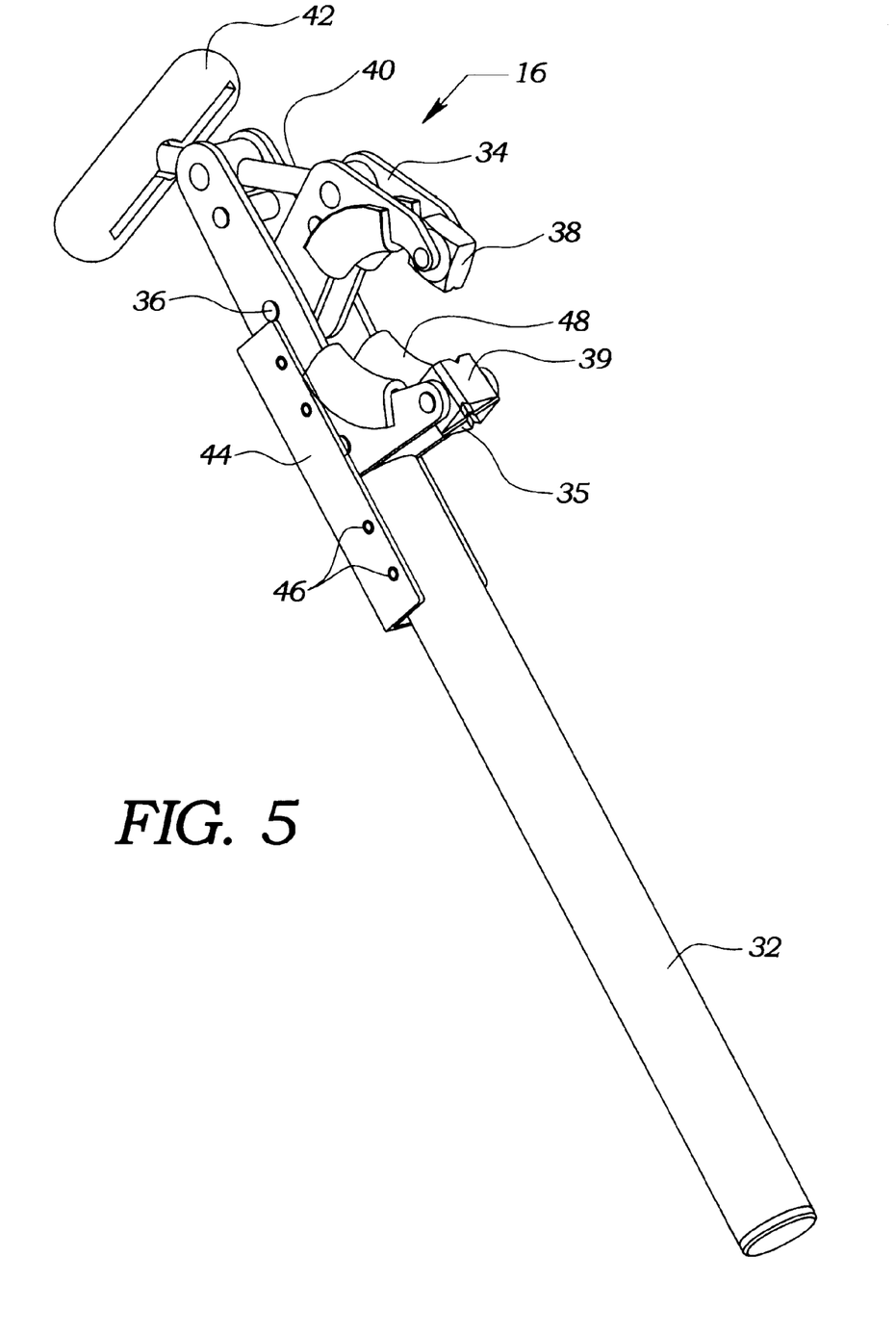
FIG. 5 is a perspective view of the claw device of FIG. 1.

Claw device 16 terminates in a projecting mounting rod 32 which is slidably received in the other socket of transverse tandem rod clamp 12. As shown in the FIGURES, claw device 16 is preferably a cantilevered clamp characterized by opposed arcuate clamping arms 34 and 35 which are mounted about a common pivot point 36. Each of the clamping arms 34 and 35 supports pivotally mounted clamping jaws, which are designated 38 and 39 respectively. An adjusting screw 40 with pin handle 42 drives the opposing clamping jaws 38 and 39 towards each other for clamping action and increased clamping tension. Suitable cantilevered clamps are commercially available from Clamp Manufacturing Co., Inc. (South El Monte, Calif.) under the designation "Kant Twist."

Claw device 16 is secured to mounting rod 32 using a connection bracket 44 and rivets 46. The clamping arms 34 and 35 preferably include anti-abrasion pads 48 to prevent damage to drum set and other standing equipment when the claw device is engaged.

Figure 2:
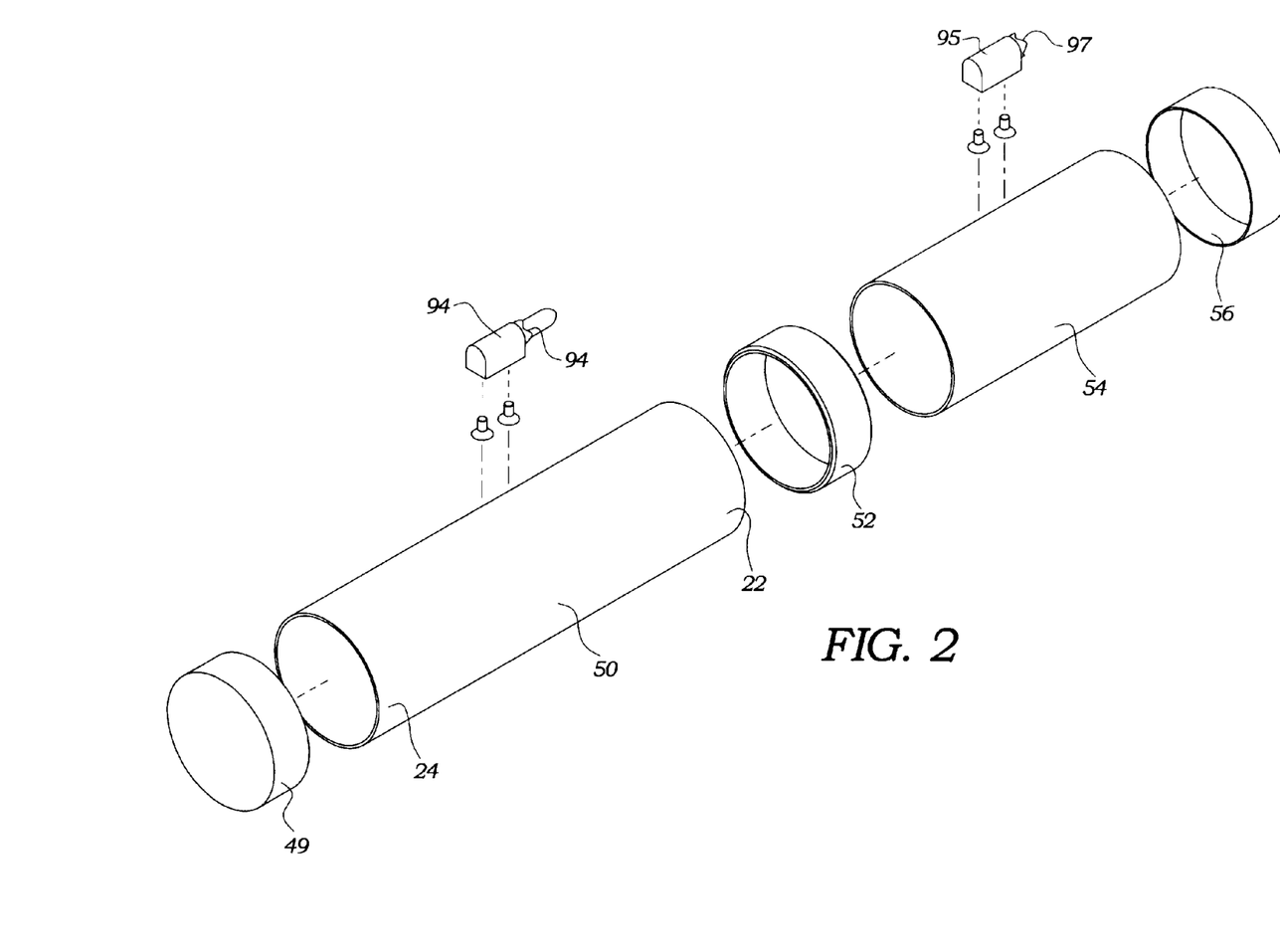
FIG. 2 is an exploded perspective view of the tubular canister of FIG. 1.

As shown in exploded format in FIG. 2, cylindrical, tubular canister 20 includes a bottom cap 49 adhesively fixed to one end of tube 50 and an open rim section 52 adhesively fixed to the other end of tube 50.

Canister 20 is preferably dimensioned such that percussion sticks retained in the canister project axially beyond the open receiving end 22 for convenient access. Although the length of drum and other percussion sticks varies by musical instrument and drummer preference, a canister length of about 10.5 inches allows common drum sticks to project beyond open receiving end 22 and rim section 52.

As shown, optional canister cover 30 is also multipart, having a tube section 54 adhesively fixed to a cap 56. The length of canister cover 30 necessarily varies according to the length of canister 20 and is preferably long enough to allow a covered canister to surround percussion sticks of various lengths. Where the canister has a length of 10.5 inches, cover 30 preferably has a length in the range of about 6.5 inches.

Figures 3, 4:
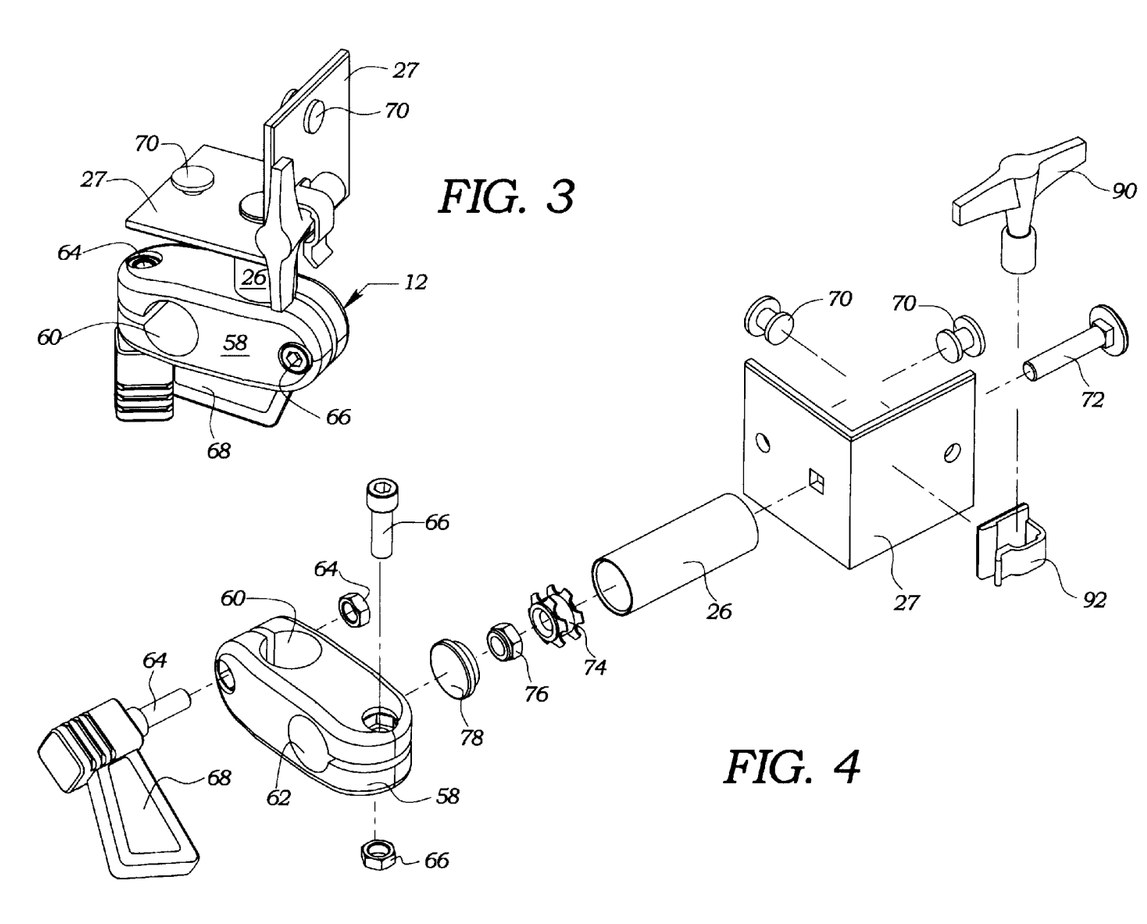
FIG. 3 is an enlarged perspective view of the transverse tandem rod clamp of FIG. 1 shown with elements of the tubular canister subassembly.
FIG. 4 is an enlarged exploded perspective view of the elements shown in FIG. 3.

As best shown in FIGS. 3 and 4, tandem rod clamp 12 includes a unitary cross block 58 that defines a pair of spaced axially skewed clamp sockets 60 and 62 and corresponding through fasteners 64 and 66. As shown in the FIGURES, the clamp sockets of cross block 58 are preferably situated such that their respective axes are normal to one another. Through fasteners 64 and 66 are likewise situated substantially normal to each other. Through fasteners 64 and 66 provide adjustable clamping tension to clamp sockets 60 and 62, respectively. A clamping-tension adjustment lever (or finger tab) 68 is preferably provided on at least one clamping fastener to allow rapid, convenient clamping-tension adjustment. Adjustment lever 68 preferably provides a ratcheting action such that the clamping tension can be adjusted without a complete rotation.

Tandem rod clamp 12 provides points of rotation for position canister 20. For example, tandem rod clamp 12 can be rotated around mounting rod 32 at socket 60. Mounting rod 26 is likewise rotatable within rod clamp socket 62.

One type of transverse tandem rod clamp suitable for use in practicing this invention is commercially available from Valu Engineering (Irvine, Calif.). Valu Engineering offers a unitary cross block under the designation "VG-620," and a compatible clamping-tension adjustment lever under the designation "VG-623."

FIGS. 3 and 4 also show a practical approach to connecting tubular canister 20 to rod clamp 12. Angle bracket 27 is secured to tubular canister 20 by rivets 70. Mounting rod 26 is in turn connected to angle bracket 27 by a fastener 72, a locking tube nut 74 and a locking nut 76. A cap 78 is also provided to cover the distal end of mounting rod 26.

A wide variety of conventional materials are suitable for making the components of the present invention. These materials include metals, woods, textiles and plastics without limitation that all or any of the elements be made of the same material. The tubular canister 20 is preferably made from a transparent plastic such as a polyacrylic acid polymer. Anti-abrasion pads 48 are preferably made of an elastomeric material.

Figure 6:
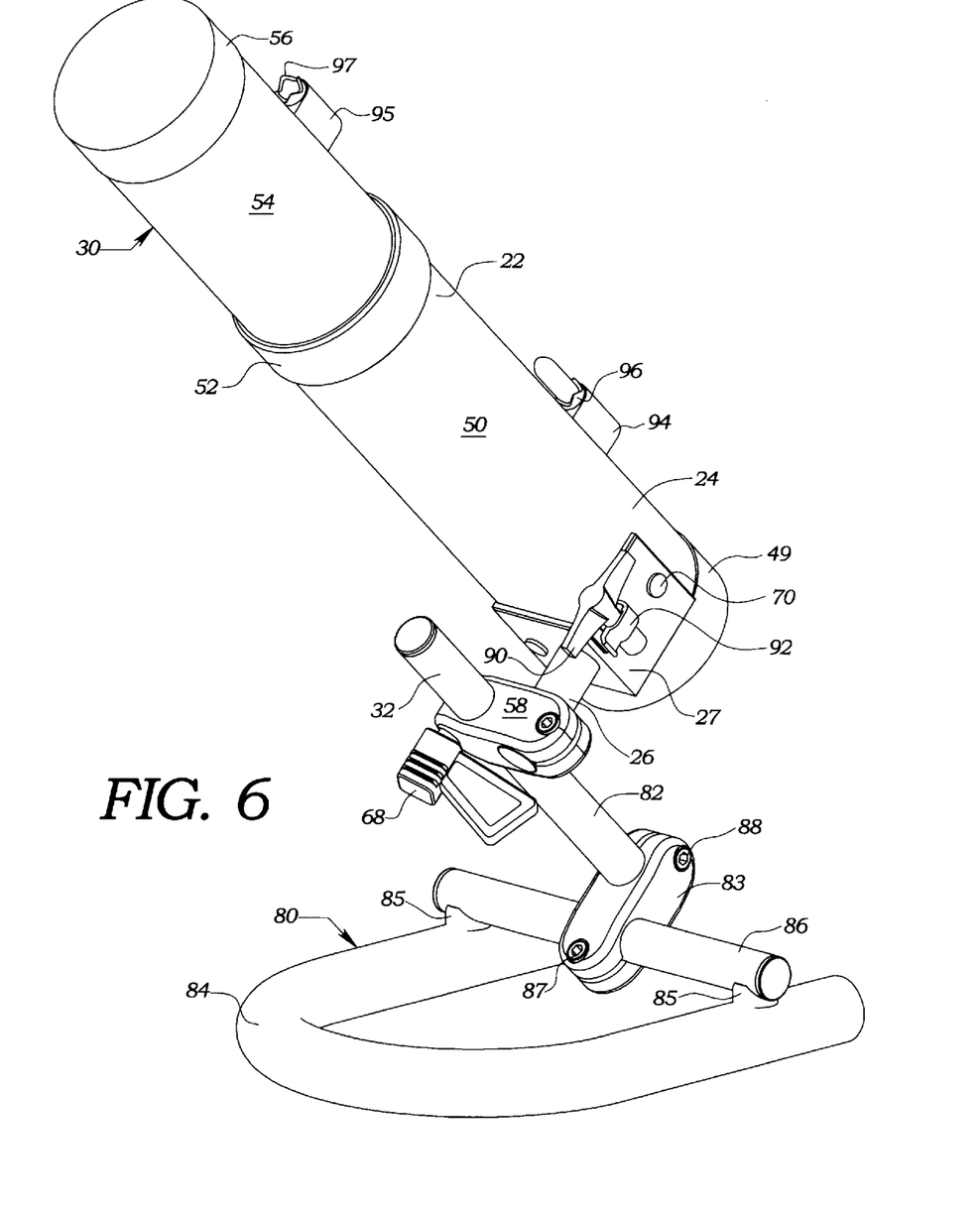
FIG. 6 is a perspective view of a freestanding alternate embodiment of the percussion stick receptacle according to the present invention.

The receptacle shown FIGS. 1 through 5 represents one of many possible configurations captured by the present invention. FIG. 6 represents one such alternate configuration. Here, the present invention is adapted to an independently free-standing configuration. A stand subassembly 80 includes a pivot stem 82 mounted to a U-shaped base 84 by a cross extension 86 and a tandem rod clamp 83. Cross extension 86 is preferably secured to U-shaped base 84 with fasteners (not shown) at stand sections 85. Tandem rod clamp 83 receives cross-extension 86 in one clamp socket and pivot stem 82 in the other clamp socket. Through fasteners 87 and 88 provide tension adjustment.

Tandem rod clamp 83 accordingly provides additional points of rotation for positioning canister 20. For example, tandem rod clamp 83 can be rotated around cross extension 86 to raise and lower the position of canister 20.

When canister 20 is sealed by cover 30, U-shaped base 84 serves as a convenient carrying handle. To that end, U-Shaped base 84 preferably includes an elastomeric or foam-like coating for easy gripping. Such a coating also substantially prevents slippage of the drum stick station when positioned on floors and table tops.

Figure 7:
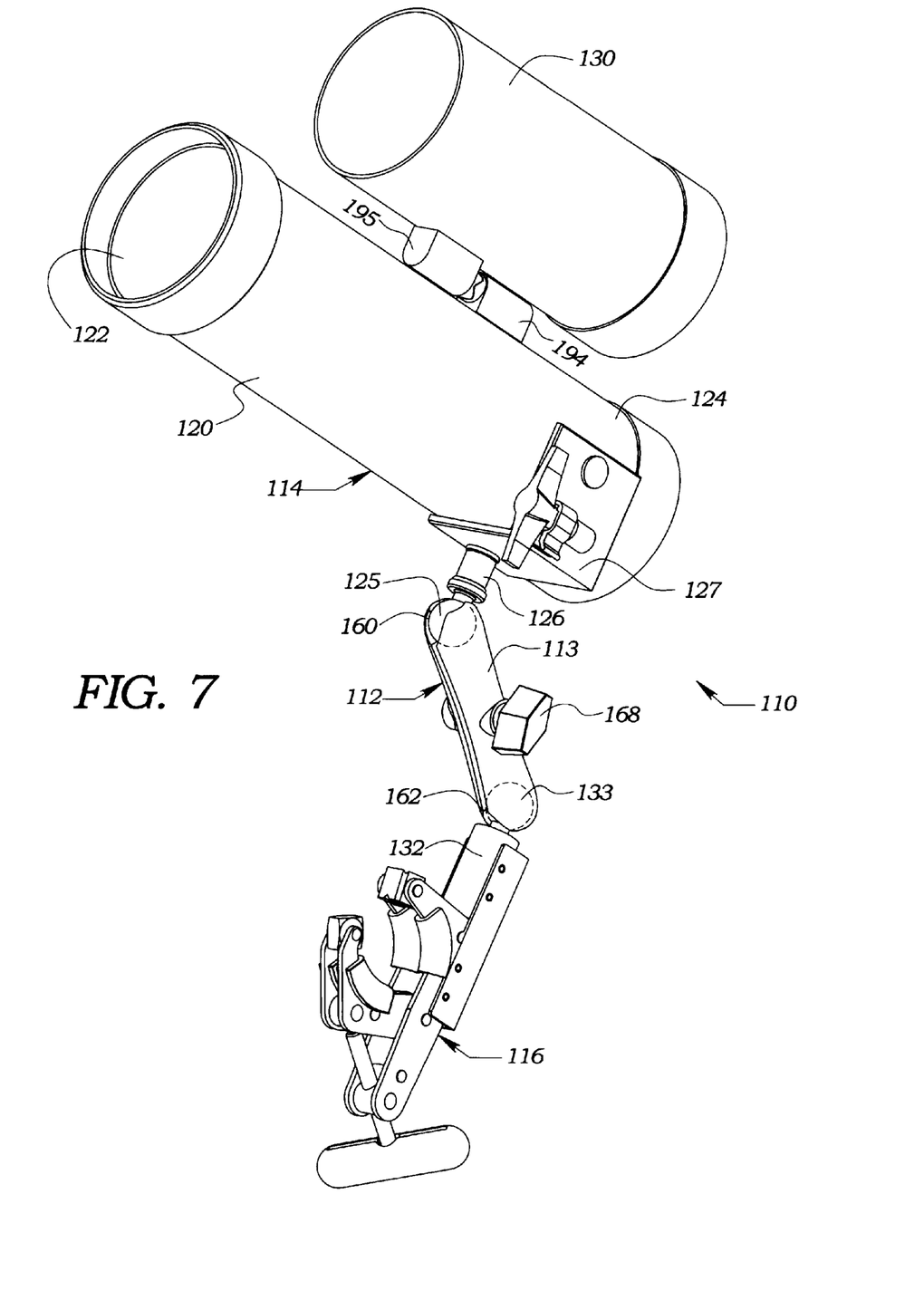
FIG. 7 is a perspective view of an alternate embodiment of the percussion stick receptacle according to the present invention.

FIG. 7 illustrates an alternate embodiment of the present invention in which a ball-and-socket clamp is utilized to provide a percussion stick station 110 having multi-axes adjustability. Percussion stick station 110 includes a tandem ball-socket clamp 112 defining a pair of spaced clampable ball sockets 160 and 162 that are positioned at opposite ends of the clamp body 113. A clamp-tension adjustment fastener with handle 168 is positioned between the clamping ball sockets 160 and 162. One type of ball-socket clamp suitable this invention is commercially available from R-A-M Technology (Seattle, Wash.) under the designation "RAM-111." Suitable ball-socket style clamps are also described in U.S. Pat. No. 5,845,885 to Carnevali, which is incorporated herein by reference to the extent it is not inconsistent.

A tubular canister subassembly 114 and a claw device 116 have substantially the same respective elements as tubular canister subassembly 14 and claw device 16 described above. The canister subassembly 114 includes a tubular canister 120, an open receiving end 122, an opposite closed bottom 124, and an outwardly extending mounting rod 126. Mounting rod 126 terminates in a ball 125, which is received in clamping socket 160. Tubular canister 20 is attached to mounting rod 126 by an angle bracket 127.

Claw device 116 terminates in a projecting mounting rod 132 with ball 133, which is received in socket 162 of tandem ball-socket clamp 112.

Figure 8:
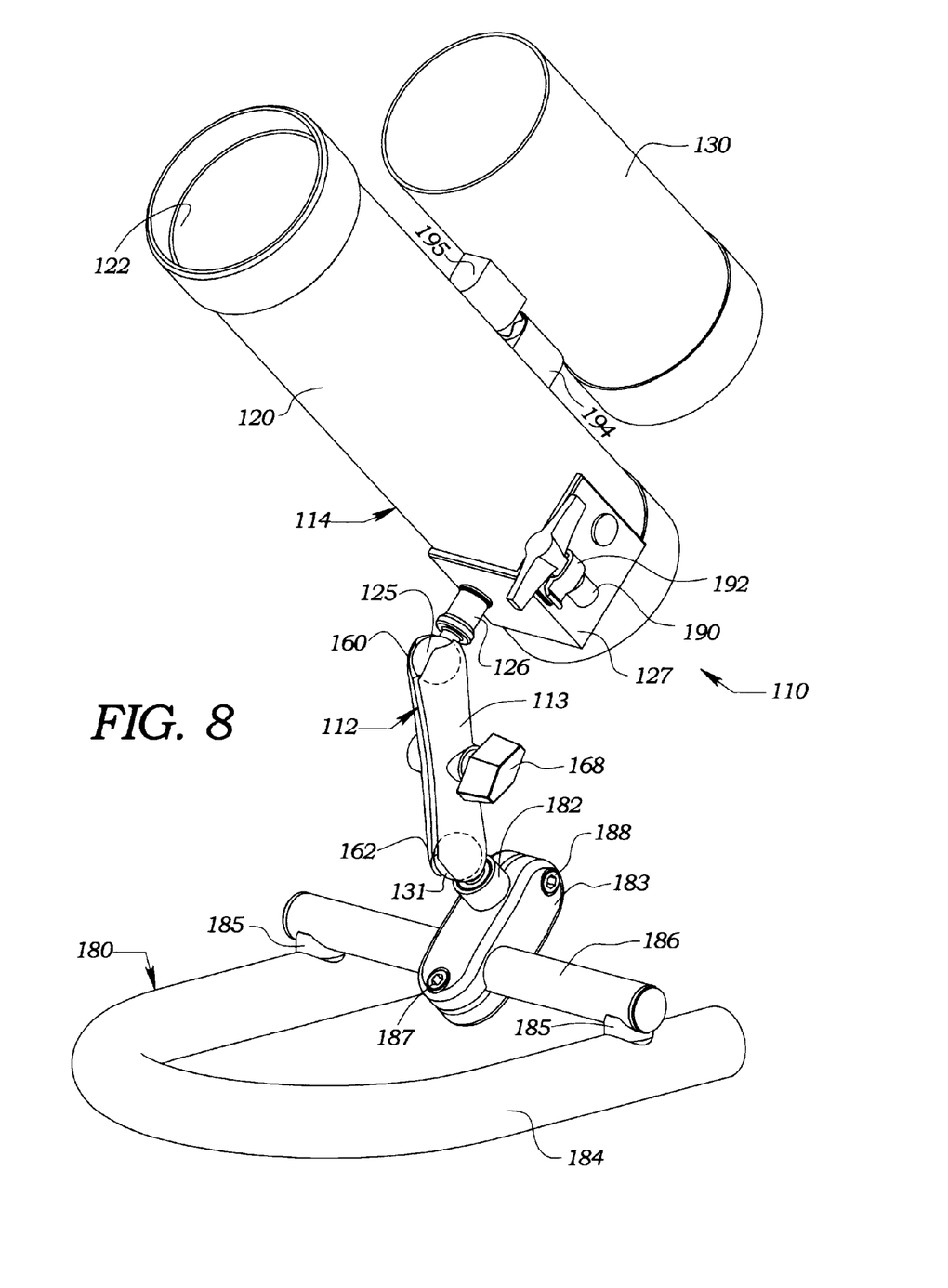
FIG. 8 is a perspective view of another, free-standing embodiment according to the present invention.

FIG. 8 illustrates the present invention in an embodiment utilizing the tandem ball-socket clamp 112 in a free standing configuration. Here, the elements of stand subassembly 180 are substantially similar to those described above for stand 80: A pivot stem 182 is mounted to a U-shaped base 184 by a cross extension 186 and a tandem rod clamp 183. Cross extension 186 is secured to U-shaped base 184 with fasteners (not shown) at stand sections 185. Tandem rod clamp 183 receives cross-extension 186 in one clamp socket and pivot stem 182 in the other clamp socket. Through fasteners 187 and 188 provide tension adjustment. Pivot stem 182 includes a ball 131, which is received in socket 162 of tandem ball-socket clamp 112.

As shown in FIGS. 1, 2, 6, 7 and 8, canister 20 (or 120) and cover 30 (or 130) preferably include components for conveniently allowing cover 30 (or 130), when removed, to be attached to canister 20 (or 120). As specifically shown in the FIGURES, a knuckle hinge mechanism includes a pin portion 94 (or 194) on canister 20 (or 120) and a socket portion 95 (or 195) on cover 30 (or 130). The hinge mechanism includes knuckles 96 (or 196) on pin portion 94 (or 194) and knuckles 97 (or 197) on socket portion 95 (or 195) to control hinge rotation into discrete positions. A suitable hinge mechanism is commercially available from Southco, Inc. (Concordia, Pa.) under the designation "in-line, lift-off knuckle style hinge." When cover 30 is attached to canister 20 as shown, the inverted cover 30 can conveniently serve as a second canister for receiving percussion sticks and the like, thereby allowing arrangement into different canisters by according to stick type or some other criterion.

Percussion stick receptacles of the present invention can accommodate other attachments as well. For example, a drum key 90 can be removably attached to the receptacle 10 (or 110) at angle bracket 27 (or 127) using a clip 92 (or 192) as shown in FIGS. 1, 2, 3, and 6 through 8.

The percussion stick receptacle of the present invention has several key features. One key feature of the present invention is its flexible, sturdy attachment system. Specifically, the present invention allows attachment at multiple positions throughout a drum set or related area. Because of the versatile claw device, the present percussion stick receptacles can be attached not only to drum stands, but also to table tops and microphone stands.

A second key feature of the present invention is extensive adjustability. Because of its multiple adjustment points, the present invention provides a percussion stick receptacle that can be positioned at points and angles around the drummer according to his or here preference. In particular, the transverse tandem rod clamp and ball-socket clamp mechanisms allow for rotation of receptacle componets to desired, convenient positions.

Another advantage to the present invention is modularity. Percussion stick receptacles according to the present invention can be interchangeably attached to either a separate, devoted floor stand or alternatively attached to existing support stands in the drum or percussion section of a musical band or orchestra. When canister 20 is sealed via cover 30, a percussion stick receptacle of the present invention also serves as a carrying case for convenient transport or storage of percussion sticks.

Numerous variations and modifications of the embodiments described above may be effected without departing from the spirit and scope of the novel features of the invention. It is to be understood that no limitations with respect to the specific system illustrated herein are intended or should be inferred. It is, of course, intended to cover by the appended claims all such modifications as fall within the scope of the claims.

I claim:

1. A receptacle suitable for receiving percussion sticks and the like, the receptacle comprising:

a transverse tandem rod clamp which defines a pair of spaced axially skewed clamp sockets;

a tubular canister having an open receiving end and an opposite closed bottom, and an outwardly extending mounting rod slidably received in one of the pair of clamp sockets; and a claw device terminating in a projecting mounting rod slidably received in the other of the clamp sockets.

2. The receptacle in accordance with claim 1 wherein at least one of the clamp sockets is equipped with a clamping-tension adjustment lever.

3. The receptacle in accordance with claim 1 wherein the transverse, tandem rod clamp includes a unitary cross block with through fasteners situated substantially normal to one another.

4. The receptacle in accordance with claim 1 wherein the transverse, tandem rod clamp includes a unitary cross block with through fasteners situated substantially normal to one another and wherein at least one of the through fasteners includes a finger tab for adjusting clamping tension.

5. The receptacle in accordance with claim 1 wherein the claw device is a cantilevered clamp attached to the projecting mounting rod.

6. The receptacle in accordance with claim 5 wherein the cantilevered clamp has opposed arcuate clamping arms which are at least partially covered with anti-abrasion pads.

7. The receptacle in accordance with claim 1 wherein the canister is substantially cylindrical.

8. A receptacle suitable for receiving percussion sticks, the receptacle comprising:

a transverse tandem rod clamp which defines a pair of spaced axially skewed clamp sockets;

a tubular canister having an open receiving end and an opposite closed bottom, and an outwardly extending mounting rod slidably received in one of the pair of clamp sockets; and a claw device terminating in a projecting mounting rod slidably received in the other of the clamp sockets, wherein the canister is made of a substantially transparent material such that percussion sticks positioned in the canister are visible.

9. The receptacle in accordance with claim 1 further comprising a removable cover for the open receiving end of the canister.

10. The receptacle in accordance with claim 1 wherein the canister is dimensioned such that percussion sticks retained therein project axially beyond the open receiving end for convenient access.

11. The receptacle in accordance with claim 1 wherein the canister is attached to the outwardly extending mounting rod by an angle bracket.

12. A receptacle suitable for receiving percussion sticks, the receptacle comprising:

a transverse tandem rod clamp which defines a pair of spaced axially skewed clamp sockets;

a tubular canister having an open receiving end and an opposite closed bottom, and an outwardly extending mounting rod slidably received in one of the pair of clamp sockets; and a claw device terminating in a projecting mounting rod slidably received in the other of the clamp sockets, wherein the canister is attached to the outwardly extending mounting rod by an angle bracket and further comprising a clip on the angle bracket for receiving a drum key.

13. A receptacle suitable for receiving percussion stick, the receptacle comprising:

a transverse tandem rod clamp which defines a pair of spaced axially skewed clamp sockets, wherein the transverse, tandem rod clamp includes a unitary cross block with through fasteners situated substantially normal to one another;

a tubular canister having an open receiving end and an opposite closed bottom, and an outwardly extending mounting rod slidably received in one of the pair of clamp sockets; and a stand subassembly having a pivot stem mounted to a base, the pivot stem being received in the other of the clamp sockets.

14. A receptacle suitable for receiving percussion stick, the receptacle comprising:

a transverse tandem rod clamp which defines a pair of spaced axially skewed clamp sockets;

a tubular canister having an open receiving end and an opposite closed bottom, and an outwardly extending mounting rod slidably received in one of the pair of clamp sockets; and a stand subassembly having a pivot stem mounted to a base, the pivot stem being received in the other of the clamp sockets, wherein the stand includes a U-shaped base, a cross-extension mounted to the U-shaped base, and a pivot stem connected to the cross-extension such that the pivot stem is situated substantially normal to the cross-extension.

15. A receptacle suitable for receiving percussion stick and the like, the receptacle comprising:

a tandem ball-socket clamp defining a pair of spaced clampable ball sockets positioned at opposite ends of the clamp and including a clamp-tension adjustment handle positioned between the clampable ball sockets;

a tubular canister subassembly having an open receiving end and an opposite closed bottom, and an outwardly extending mounting ball received in one of the pair of clamp sockets; and a claw subassembly comprising a gripping clamp coupled to a second mounting ball received in the other of the clamp sockets.

* * * * *